Figure 1:
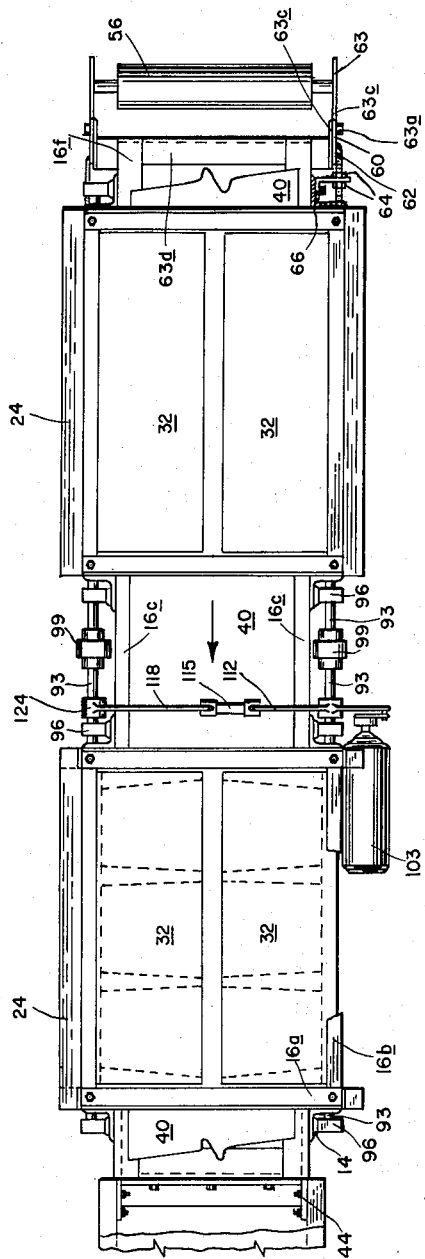

Dec. 31, 1963   J. V. ATANASOFF   3,115,965
SACK HANDLING APPARATUS

Filed March 24, 1961   3 Sheets-Sheet 1

INVENTOR
JOHN V. ATANASOFF

BY *Albert W Zalkind*

ATTORNEY

Dec. 31, 1963     J. V. ATANASOFF     3,115,965
SACK HANDLING APPARATUS

Filed March 24, 1961     3 Sheets-Sheet 2

Dec. 31, 1963    J. V. ATANASOFF    3,115,965
SACK HANDLING APPARATUS
Filed March 24, 1961    3 Sheets-Sheet 3
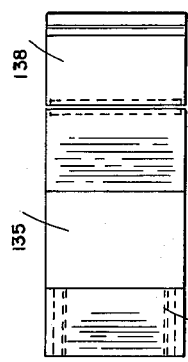
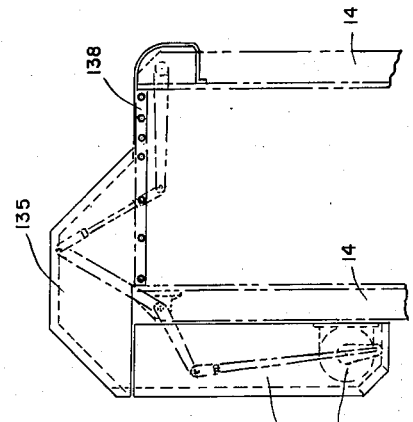
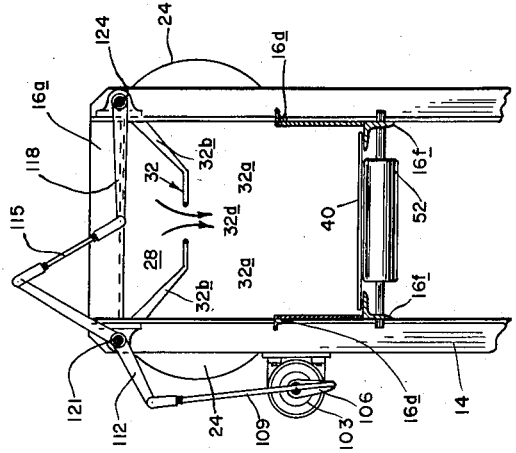
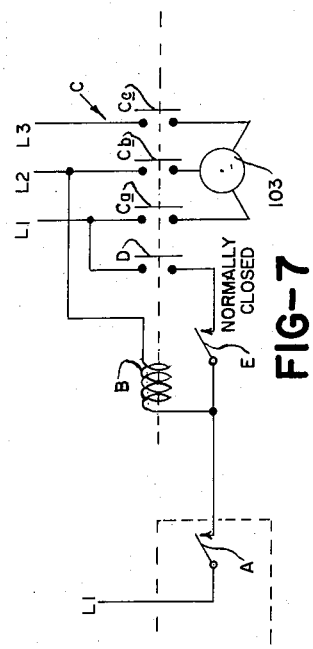
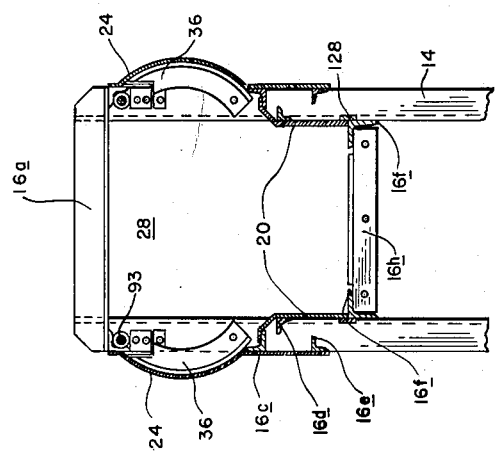
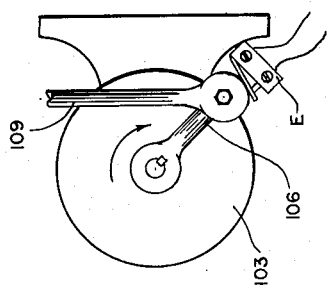

3,115,965
SACK HANDLING APPARATUS
John V. Atanasoff, Frederick, Md., assignor to Aerojet-General Corporation, Azusa, Calif., a corporation of Ohio
Filed Mar. 24, 1961, Ser. No. 98,101
1 Claim. (Cl. 198—54)

This invention relates to mail sorting equipment and more particularly to apparatus for dropping sacks of mail onto conveyor belts. In my previously filed application for Article Sorting System, S.N. 4,322, filed January 25, 1960, now Patent No. 3,033,366, issued May 8, 1962, there is disclosed an apparatus for manually controlling the diverting of articles carried on a conveyor belt, wherein said articles are diverted at various stations along the belt, according to geographical destination, by an operator-controlled device acting through power-actuated article diverting elements poised above the belt. The present invention constitutes an extension of that invention by providing a novel sack dropping equipment, or hopper, located at the upstream end of the conveyor belt, which makes this sorting system suitable for sorting large, non-rigid items such as mail sacks.

It is an object of the present invention to provide an apparatus which will temporarily hold two or more sacks of mail or parcels and simultaneously drop said sacks onto a conveyor belt moving therebelow.

It is another object of the invention to provide a rugged device capable of handling heavy mail sacks of the order of 50 to 150 lbs. of weight each.

It is a further object of the invention to provide a multiple dropping machine, or multiple hopper arrangement, actuated by a single motor and a single mechanical linkage.

It is a still further object of the invention to provide an apparatus of the class described which will be exceedingly simple in construction, compact, and contemplated for indefinite service without breakdown.

Briefly, my invention comprises a structure effecting a pair of twin hoppers, of angle iron frame construction, and generally box-like shape. The top portion of each of the hoppers is made as a compartment with a split bottom wall; thus, the bottom wall consists of a pair of platforms or sack support panels hinged to the sides of the hopper and normally held in an upward or compartment closing position. The compartment of each hopper thus effected may be of the order of a foot or so in depth and capable of holding a standard mail sack. The sacks are manually slid from a pile, down a ramp, and into the compartment. Due to the pivoted construction of the bottom panels of the compartments, they may be swung downwardly, within the confines of the respective housings. Thus, by means of power actuation, comprising a single motor and linkage system located intermediate such housings, the bottom panels of each compartment may be simultaneously swung downwardly to effect dropping of respective sacks onto a moving conveyor belt which carries the sacks to a diverting apparatus downstream.

The conveyor belt runs below the hopper compartments and is sufficiently vertically spaced below the drop-out or sack support panels so as to accommodate the bulk of any sack handled in the apparatus.

A particular feature of the invention is the supporting means for the moving belt, which is constructed as part of the framework of the twin hoppers. A further particular feature of the apparatus is the construction of a bulging compartment housing whereby the drop-out panels may swing downwardly, fully, so that any bulk of mail sacks is completely cleared in falling through the housing onto the belt.

Figure 2:
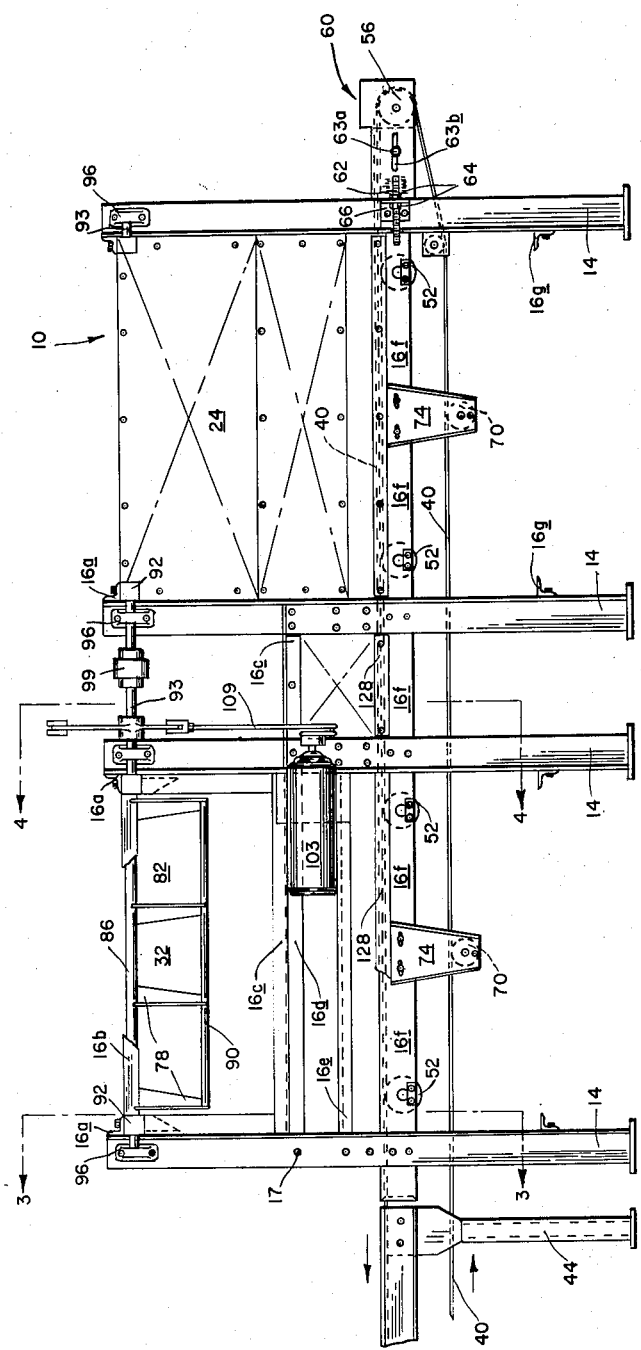

A detailed description of the invention now follows in conjunction with the appended drawing, in which:

FIG. 1 is a plan view of the overall twin hopper assembly;
FIG. 2 is an elevation thereof;
FIG. 3 is a section taken through 3—3 of FIG. 2;
FIG. 4 is a section taken through 4—4 of FIG. 2;
FIG. 5 is an elevation of the guard housing for the moving parts of the apparatus;
FIG. 6 is a plan view thereof;
FIG. 7 shows a wiring diagram for motor control; and
FIG. 8 shows a portion of the motor linkage and one of the switches of FIG. 7.

Referring now to the drawing, the invention comprises a pair of substantially identical hoppers 10 having a vertical framework of angle iron posts 14 located at the four corners of the box-like casings or housings clearly shown in FIGS. 1 through 4. Thus, horizontal angle iron rails, such as 16a thru 16h may be welded or otherwise secured as by rivets such as 17, intermediate the vertical posts to form a complete framework of a box-like and rigid support frame.

The arrangement of the rails comprises various pairs of through rails and cross rails, certain pairs for structural strength, as well as inter-connection of the two hoppers and for support of various components of the machine. Thus, cross rails 16a at each of the upper ends of the hoppers obviously provide lateral support for posts 14 as do the lower rails 16q and 16h. The rails 16c and f are longitudinal through rails which render longitudinal support, as well as effect inter-connection of the hoppers. The rails 16e render longitudinal support for their respective hoppers.

To such frame may be attached side plates such as 20 and 24 and it will be noted that the plates 24 are convexedly bowed outwardly in order to effect greater lateral dimension of the compartments 28 (see FIG. 3) which are substantially closed at their bottoms by pivoted drop-out or sack support panels 32. The panels are swung downwardly in the directions (FIG. 4) of the arrows to drop mail sacks onto a conveyor belt, as hereinafter described in detail.

It will be apparent that the general framework may be made by welding, bolting, riveting, or by the use of any other suitable fastening methods. The curved plates 24 may be suitably fastened to respective curved angle iron frame elements 36 disposed at the ends of such plates, the elements 36 being riveted, as indicated, or otherwise bolted or fastened to the vertical posts 14 for each of the hoppers, all as will be clearly understood from consideration of the drawing.

A continuous conveyor belt 40 forms the bottom closure for the hoppers and it will be noted that such belt has its lower flight moving toward the hoppers and its upper flight away from the hoppers, as indicated by the arrows in FIG. 2, so that sacks of mail will be conveyed outwardly toward the left to the diverting device (not shown). The belt support comprises a channel iron standard 44 secured to rails 16f (FIG. 2) outboard of the hoppers, and a pair of rollers 52, for the upper flight. Such rollers 52 are journaled in the vertical flanges of rails 16f (FIG. 4). The belt, at its sides, has sliding support on the horizontal flanges of rails 16f.

As clearly shown in FIG. 2, the belt reverses outboard of the right end of the hopper construction around a roller 56 supported in a tension adjusting frame 60 carried by the posts 14 at the right end of the machine, as shown. Belt tension may be provided by threaded screws or bolts 62. The supporting structure for the outboard roller 56, as will be evident from FIGS. 1 and 2, comprises side flanges 63 carried slidably by pins 63a protruding into slots 63b of flanges 63. The pins are secured to arms 63c carried by a cross rail 63d secured at the ends of through rails 16f. Screws 62 are adjustably mounted in angle elements 66 carried by respective end posts 14, and are welded to respective flanges 63. The screws effect translation of roller 56, for tensioning, upon adjustment of nut pairs 64 carried on the bolts and tightened against opposite sides of respective angle elements 66.

The lower flight of the belt is supported on rollers 70, there being one such roller for each hopper, as shown in FIG. 2, the rollers being supported in suitable hanger plates 74 secured to longitudinally extending rails 16f.

The compartments 28 (FIG. 4) are substantially closed at their bottoms by two pivoted panels 32 as hereinabove mentioned. The panels 32 are of angular construction, as shown, having horizontal areas 32a extending into slanted areas 32b. The panels may be advantageously constructed for strength and light weight by means of a hollow structure effected by spaced angle iron elements 78 (FIG. 2) ensheathed in aluminum sheeting 82, which sheeting envelops the frame elements 78, as well as longitudinal frame elements 86 and 90. Thus, the transverse elements 78 and the longitudinal frame elements 86 and 90 may be of all welded construction with the sheeting 82 secured thereto by bolts or spot welding or the like. At each of the upper ends of the panels there is fastened in a block 92 a stub shaft 93, which shafts are journaled in respective bearing blocks 96 secured to posts 14. As shown in FIG. 1, the adjoining shafts 93 are coupled intermediate the hoppers by collars or sleeves 99. It will thus be apparent that corresponding panels of the hoppers are integrally connected for pivotal movement on each side of the hoppers. All panels move simultaneously upwardly or downwardly by power actuation of a motor 103 (FIGS. 2 and 4) coupled through a crank arm 106 to a link 109 which is articulated to a bell crank lever 112 which actuates a pitman 115 to actuate a lever 118. The bell crank 112 is keyed to an inner stub shaft of the left-hand hopper at 121 (FIG. 4) while lever 118 is keyed to the corresponding inner stub shaft at 124. Accordingly, it will be apparent that upon rotation of crank 106, the linage movement is such as to swing the panels 32 downwardly to the full extent afforded by the curved plates 24 so as to fully open the compartments 28, and continued rotation of crank 106 swings the panels back to the normal sack support position shown in FIG. 4. Thus, a single rotation of the crank arm 106 effects a cycle of movement of the panels to drop any sacks resting thereon onto belt 40, with continuing return motion of the panels to sack supporting position.

The pitman 115 may be made adjustable, in accordance with well known practice, in order to compensate for tolerances of manufacture of the stub shafts and their bearing supports.

Guide strips or flanges 128 are secured as by rivets, or otherwise, to the vertical flanges of rails 16f and are coextensive therewith. See FIGS. 2 and 3. The strips 128 serve as strengthening members and also as side guards to prevent articles such as sacks from sliding transversely off the belt.

Referring now to FIGS. 5 and 6, a sheet metal hood construction is disclosed for housing the moving parts of the machine. The construction may be simple in nature and consists of a vertical box-like hood 132 which encloses the motor 103 and the linkage system connected thereto. A top hood 135 of frustrum shape encloses the upper end of the bell crank and pitman. A flange enclosure housing 138 completes the mechanism and casing structure. It will be apparent that the three housing members may readily be attached to the inwardly adjoining posts 114, which are disposed on either side of the actuating linkage.

The single cycling of the motor is explained in conjunction with FIGS. 7 and 8. In FIG. 7, when switch A is momentarily closed, current will flow from line $L_1$ through switch A and through relay coil B to line $L_2$. This flow of current through coil B causes switch C, made up of three contacts $C_a$, $C_b$ and $C_c$, and switch D to close. Closing of switch C applies power to the motor 106 and starts the operation. Closing of switch D provides a second path by which current may run from $L_1$ through coil B to $L_2$. Thus latching the relay so that the switches remain closed even after A opens again. After the motor shaft has rotated through almost one revolution to the position shown in solid lines on FIG. 8, the crank arm 106 contacts and opens switch E. This breaks the current through coil B (FIG. 7) and allows switches C and D to open. Opening of switch C removes power from the motor and causes an internal brake to be applied so that it stops in the position shown in FIG. 4. Opening of switch D prevents reenergizing of coil B by the reclosing of switch E, so that the mechanism remains in this position until switch A is again closed to initiate a new cycle.

Having thus described my invention, I am aware that changes may be made without departing from the spirit thereof and, therefore, I do not seek to be limited to the precise illustrations given herein, except as set forth in the appended claim.

I claim:

A twin hopper construction comprising a pair of spaced hoppers, each hopper having a pair of opposed walls forming movable sides and a bottom for the respective hopper, shafts secured to upper edges of respective walls, corresponding shafts of said hoppers being joined in axial alignment, lever actuating means disposed intermediate said hoppers and connected to said shafts for joint rotation thereof to effect swinging of said walls for opening and closing respective hoppers, each hopper comprising a pair of opposed fixed external end walls, vertical rail means secured to said external walls for support thereof, bearing elements carried by said vertical rail means for support of said shafts, horizontal rail means below said hoppers and connecting said vertical rail means, and a common conveyor belt extending below said hoppers for receiving articles therefrom, rollers carried by said horizontal rails, said conveyor belt having a top flight supported on said rollers and having edges slidably supported on said rails, hanger elements depending from said rails, and rollers carried by said hanger elements for supporting the lower flight of said belt, a roller carried by said rails around which said belt reverses from upper to lower flights, and means for effecting translation of said roller to adjust belt tension.

References Cited in the file of this patent

UNITED STATES PATENTS

| | | |
|---|---|---|
| 675,196 | Colahan | May 28, 1901 |
| 1,218,908 | Shutt | Mar. 13, 1917 |
| 1,674,556 | McClelland | June 19, 1928 |
| 1,686,121 | Brennan | Oct. 2, 1928 |
| 1,850,589 | Le Tourneau | Mar. 22, 1932 |
| 2,094,728 | Tinsley | Oct. 5, 1937 |
| 2,217,983 | Hopkins | Oct. 15, 1940 |
| 2,300,753 | Wagner et al. | Nov. 3, 1942 |
| 2,647,617 | Spurgeon et al. | Aug. 4, 1953 |
| 2,734,668 | Gardes | Feb. 14, 1956 |